United States Patent
Hetherington et al.

(10) Patent No.: US 6,339,755 B1
(45) Date of Patent: Jan. 15, 2002

(54) METHOD, SYSTEM AND DATA STRUCTURE FOR SPLITTING LANGUAGE AND LOCALE PROPERTIES IN A DATA PROCESSING SYSTEM

(75) Inventors: David James Hetherington, Austin, TX (US); David Bruce Kumhyr, Fuquay-Varina, NC (US); Joseph C. Ross, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/211,816

(22) Filed: Dec. 15, 1998

(51) Int. Cl.[7] .............................. G06F 17/20; G06F 3/00
(52) U.S. Cl. ........................................... 704/8; 345/334
(58) Field of Search .................... 704/1–3, 7–8; 707/530, 536; 345/333, 334

(56) References Cited

U.S. PATENT DOCUMENTS

| | | | |
|---|---|---|---|
| 5,416,903 A | * 5/1995 | Malcolm | 345/333 |
| 5,499,335 A | * 3/1996 | Silver et al. | 704/8 |
| 5,664,206 A | * 9/1997 | Murow et al. | 704/8 |
| 5,671,378 A | * 9/1997 | Acker et al. | 345/334 |
| 5,675,818 A | * 10/1997 | Kennedy | 704/8 |
| 5,678,039 A | * 10/1997 | Hinks et al. | 704/8 |
| 5,734,597 A | * 3/1998 | Molnar et al. | 704/8 |
| 5,745,643 A | * 4/1998 | Mishina | 386/108 |
| 5,812,964 A | 9/1998 | Finger | 704/7 |
| 5,907,326 A | * 5/1999 | Atkin et al. | 345/334 |
| 5,917,484 A | * 6/1999 | Mullaney | 345/333 |
| 6,018,344 A | * 1/2000 | Harada et al. | 345/357 |
| 6,073,090 A | * 6/2000 | Fortune et al. | 704/8 |

* cited by examiner

*Primary Examiner*—Patrick N. Edouard
(74) *Attorney, Agent, or Firm*—Marilyn Smith Dawkins; Bracewell & Patterson, L.L.P.

(57) ABSTRACT

Separate language and locale properties are implemented within a data processing system. The language property only controls selection of the human language employed for user interface text and, preferably, the sort order for text-based items displayed in the user interface. The locale property controls all other cultural support, number format, date format, currency and currency format, time format, etc. This split allows a particular language to be selected without utilizing a particular set of cultural conventions associated with a region in which the selected language is dominant. Instead, the cultural conventions may be selected for an entirely different region. The bifurcation of language and locale properties also facilitates dynamic switching of user interface views, allowing layering of user interface text from underlying operational components and simplifying the requirements associated with changing from user interface text in one human language to the same user interface text in a different human language.

25 Claims, 5 Drawing Sheets

METHOD, SYSTEM AND DATA STRUCTURE FOR SPLITTING LANGUAGE AND LOCALE PROPERTIES IN A DATA PROCESSING SYSTEM

RELATED APPLICATIONS

The present invention is related to the subject matter of the following commonly assigned, copending U.S. patent applications: Ser. No. 09/211,798 entitled "METHOD, SYSTEM, AND COMPUTER PROGRAM PRODUCT FOR DYNAMIC LANGUAGE SWITCHING IN USER INTERFACE MENUS, HELP TEXT, AND DIALOGS" and filed Dec. 15, 1998; and Ser. No. 09/211,814 entitled "METHOD, SYSTEM, AND COMPUTER PROGRAM PRODUCT FOR DYNAMIC DELIVERY OF HUMAN LANGUAGE TRANSLATIONS DURING SOFTWARE OPERATION" and filed Dec. 15, 1998. The content of the above-referenced applications is incorporated herein by reference.

BACKGROUND OF THE INVENTION

1. Technical Field

The present invention relates in general to multilingual and multicultural support in data processing systems and in particular to separately defining language and regional cultural conventions for user interface displays within data processing systems. Still more particularly, the present invention relates to providing separate language and locale properties individually defining language and regional cultural conventions for user interface displays in a data processing system.

2. Description of the Related Art

Most contemporary operating systems include a "Locale" or "regional setting" attribute or property, which is typically is defined as specifying an identifiable political, geographical, or cultural region employing a distinct language and certain conventions such as date formats, currency types and formats, number or time formats, sorting orders, and the like. This attribute acts as a combined setting for both the language employed in a data processing system's user interface and the regional conventions identified above which are employed for that data processing system.

The combined language/locale property for a data processing system is conventionally integrated and selected as part of the language selection, so that users are provided with options for the locale properties or "regional setting" such as "English (United States)," "English (South Africa)," "French (Belgian)," or "French (Canadian)," etc. All cultural support, including display formatting and sorting orders, for applications within the data processing system are then derived from this single property.

Data processing systems configured with a combined language/locale property from which all language and cultural support features are set lack flexibility in defining the manner in which dates and currencies are displayed and in which numbers and text strings are sorted. Such environments also inhibit multilingual support by creating significant barriers to dynamic language and/or locale shifting.

It would be desirable, therefore, to provide a mechanism for providing separate definition of language and locale properties within a data processing system.

SUMMARY OF THE INVENTION

It is therefore one object of the present invention to provide an improved method and apparatus for multilingual and multicultural support in data processing systems.

It is another object of the present invention to provide a method and apparatus for separately defining language and regional cultural conventions for user interface displays within data processing systems.

It is yet another object of the present invention to provide a method and apparatus for providing separate language and locale properties individually defining language and regional cultural conventions for user interface displays in a data processing system.

The foregoing objects are achieved as is now described. Separate language and locale properties are implemented within a data processing system. The language property only controls selection of the human language employed for user interface text and, preferably, the sort order for textbased items displayed in the user interface. The locale property controls all other cultural support, including holidays and religious observances, number format, date format, currency and currency format, time format, etc. This split allows a particular language to be selected without utilizing a particular set of cultural conventions associated with a region in which the selected language is dominant. Instead, the cultural conventions may be selected for an entirely different region. The bifurcation of language and locale properties also facilitates dynamic switching of user interface views, allowing layering of user interface text from underlying operational components and simplifying the requirements associated with changing from user interface text in one human language to the same user interface text in a different human language.

The above as well as additional objects, features, and advantages of the present invention will become apparent in the following detailed written description.

DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
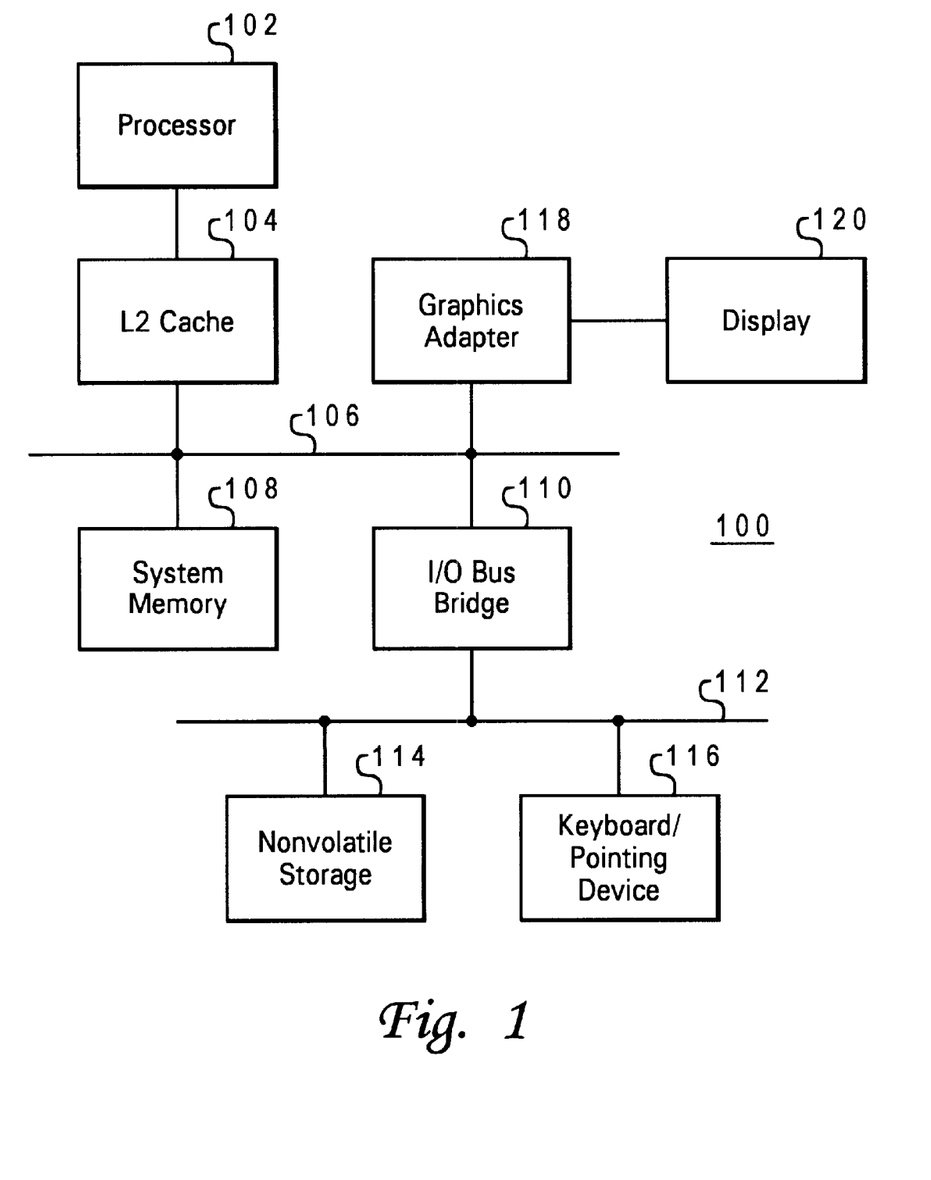
FIG. 1 depicts a block diagram of a data processing system in which a preferred embodiment of the present invention.

With reference now to the figures, and in particular with reference to FIG. 1, a block diagram of a data processing system in which a preferred embodiment of the present invention may be implemented is depicted. Data processing system 100 may be, for example, one of the Aptiva® models of personal computers available from International Business Machines Corporation of Armonk, N.Y. Data processing system 100 includes a processor 102, which in the exemplary embodiment is connected to a level two (L2) cache 104, which is connected in turn to a system bus 106. In the exemplary embodiment, data processing system 100 includes graphics adapter 118 connected to system bus 106, receiving user interface information for display 120.

Also connected to system bus 106 is system memory 108 and input/output (I/O) bus bridge 110. I/O bus bridge 110 couples I/O bus 112 to system bus 106, relaying and/or transforming data transactions from one bus to the other. Peripheral devices such as nonvolatile storage 114, which may be a hard disk drive, and keyboard/pointing device 116, which may include a conventional mouse, a trackball, or the like, are connected to I/O bus 112.

The exemplary embodiment shown in FIG. 1 is provided solely for the purposes of explaining the invention and those skilled in the art will recognize that numerous variations are possible, both in form and function. For instance, data processing system 100 might also include a compact disk read-only memory (CD-ROM) or digital versatile disk (DVD) drive, a sound card and audio speakers, and numerous other optional components. All such variations are believed to be within the spirit and scope of the present invention. Data processing system 100 and the Java implementation examples below are provided solely as examples for the purposes of explanation and are not intended to imply architectural limitations. Those skilled in the art will recognize the numerous programming languages which may be utilized, all of which are believed to be embraced within the spirit and scope of the invention.

Figure 2A:
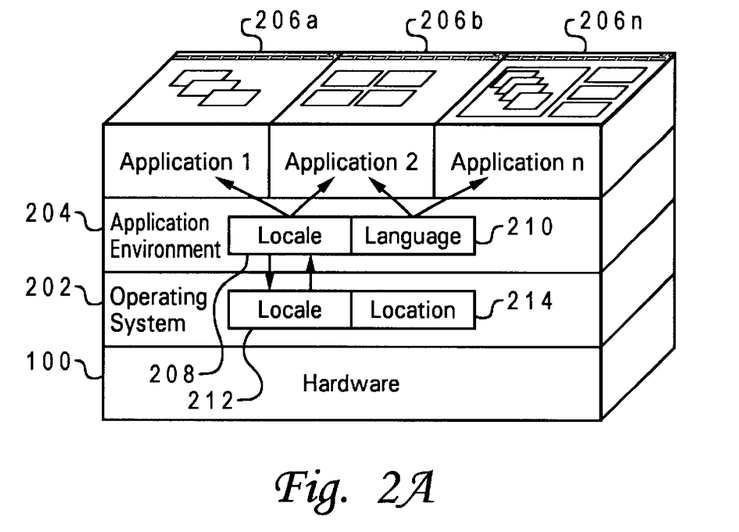
FIGS. 2A–2D are diagrams of splitting language and locale properties and of employing separate language and locale properties in accordance with a preferred embodiment of the present invention.

Referring to FIG. 2A, a diagram of splitting language and locale properties in accordance with a preferred embodiment of the present invention is illustrated. As is known in the art, an operating system 202 runs on the hardware making up data processing system 100. Operating system 202, as depicted in FIG. 2A, is meant to include all software routines which control interaction with hardware 100, such as a basic input/output system (BIOS) allowing data reads and writes to a hard disk drive or other nonvolatile memory, as well as those software routines which enable an application to be utilized on data processing system 100. Operating system 202 may be, for instance, any of the Windows™ operating systems available from Microsoft Corporation of Redmond, Wash., including Windows NT.

In the preferred embodiment, data processing system 100 also includes an application environment 204 running on top of operating system 202, within which applications are executed. Application environment 204 may be designed to permit distributed applications to execute on a network or group of networks spanning different systems or platforms, providing comprehensive event integration, cross-domain event processing and correlation, event response and notification, and automation. Thus, for instance, environment 204 in the exemplary embodiment may be a highly available environment of a type known in the art which is managed or accessed through the Tivoli Enterprise Console™ application for highly available and/or distributed applications.

Applications 206a–206n in the exemplary embodiment preferably run on top of operating system 202 and environment 204, and may therefore have some communication directly with operating system 202. However, at least some event notification and response or similar communication takes place between applications 206a–206n and environment 204, and at least some attributes or properties are inherited or received by applications 206a–206n from environment 204. Applications 206a–206n may thus include the Tivoli NetView™ Performance Monitor or the Tivoli Global Enterprise Manager™ (GEM) applications.

In the present invention, the structure of the cultural support features are split between locale and language properties 208 and 210, respectively. The locale property 208 is employed to support cultural conventions such as regional holidays and religious dates, observance of daylight savings time, etc., and display formatting of currency, numbers, dates, and the like. The display formatting includes, for instance, the currency symbol ($, £, ¥, etc.) and location (before or after the amount), the digit grouping symbol (",", or none), the number of digits in a group (3 or unlimited), decimal symbol, and decimal places shown (round to 100ths place, etc) for numbers (e.g., "123, 456.78"), and date formats (e.g., "11-29-98" versus "29-11-98").

The language and, in the preferred embodiment, the sorting orders employed for text strings, numbers, dates, etc., are based on language property 210. This bifurcation allows an operator or program to display data in one manner (say, utilizing a particular date format) while the language and sorting order are set to another convention (such as a non-native language or sorting based on a local preference).

As an example, the locale and language properties 208 and 210 may be derived from user preferences which are specified by a code segment such as:

```
//
// The Locale property saves the last Locale selected
//
pref=grp.getPreference(LOCALE);
if(pref!=null)
    ivLocale=(Locale)pref.getPref(" ");
//
// The Language property saves the last Language selected
//
pref=grp.getPreference(LANGUAGE);
if(pref!=null)
    ivLanguage=((UFStringPreference)pref).getPref( );
```

The locale and language properties 208 and 210 may be selectively altered by a user through interfaces optionally provided for that purpose.

In a preferred embodiment, locale property 208 contains an upper-case, two letter ISO Country Code as defined by ISO-3166 (e.g., "US" for United States or "JP" for Japan), while language property 210 contains a lower-case, two letter ISO Language Code as defined by ISO-639 (e.g., "en" for English or "ru" for Russian).

In the exemplary embodiment, the split of locale and language properties 208 and 210 is implemented within environment 204, but may be implemented within operating system 202. In the embodiment shown, locale property 208 may be inherited from the prior art, combined language and locale property 208 of the underlying operating system 202. Environment 204 may also include methods for altering the combined language/locale property 212 within the underlying operating system 202 to match the default or presently selected locale property 208 within environment 204. Those skilled in the art will recognize that the split of locale and language properties 208 and 210 may alternatively be implemented within operating system 202.

It should also be noted that the split of locale and language properties 208 and 210 differs from the split between combined language/locale or regional setting properties 212 and location properties 214 currently implemented within conventional operating systems. In such systems, support for human language and regional cultural conventions is typically lumped together under the control of only one language/locale property 212. Language/locale property 212 controls the language and sorting orders employed, while "location" property 214, if any, is generally only a time zone property which defines only the applicable time zone and properties based on the current time zone such as observance of daylight savings time.

A major benefit of splitting language and locale is derived for locales where a translation for the indigenous language is not supported. For example, a customer in Norway may not be provided with a Norwegian language translation for the user interface, requiring the user to select another, supported language for the user interface such as English or French. If a Norwegian human language translation later becomes available, the customer may elect that language at that time.

Even though a human language is not supproted, however, limited support for the cultural conventions of the Norwegian locale may be provided, or the user may prefer the French language but United States formatting, in which case the language and locale split allows the user to select their preferred data formatting for the Norwegian locale. Additionally, many regions have multiple indigenous or official languages, such as Canada, where English and French are both utilized. Nonetheless, a common set of cultural conventions for that region exists. With the present invention, unnecessary replication of support for regional cultural conventions for association with different languages is avoided.

Figure 2B:
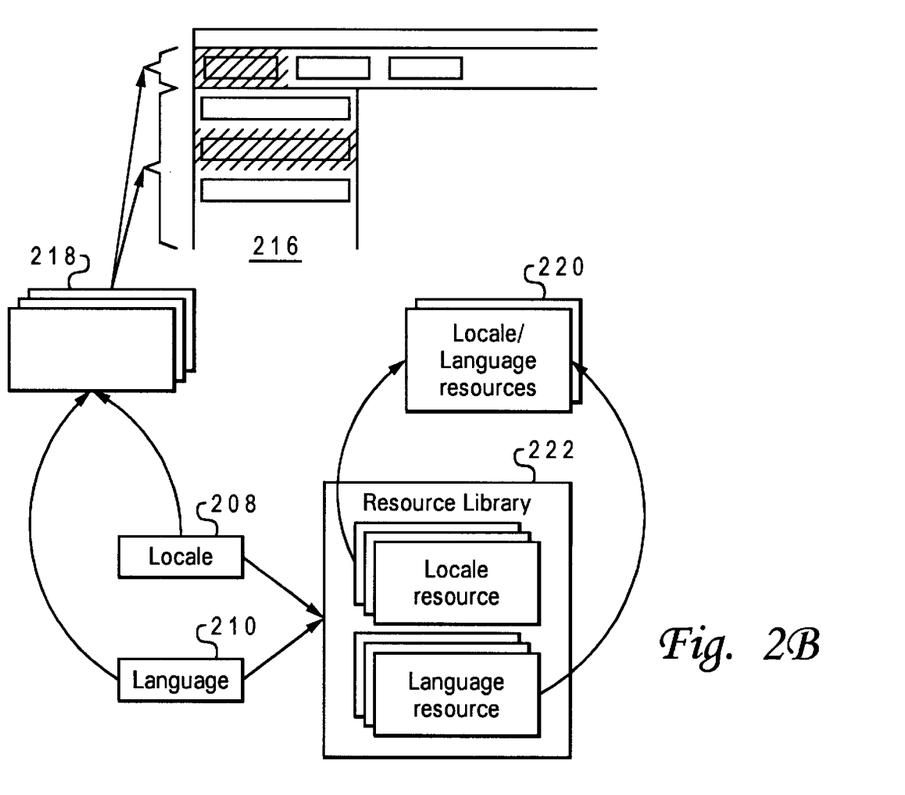
Figure 2C:
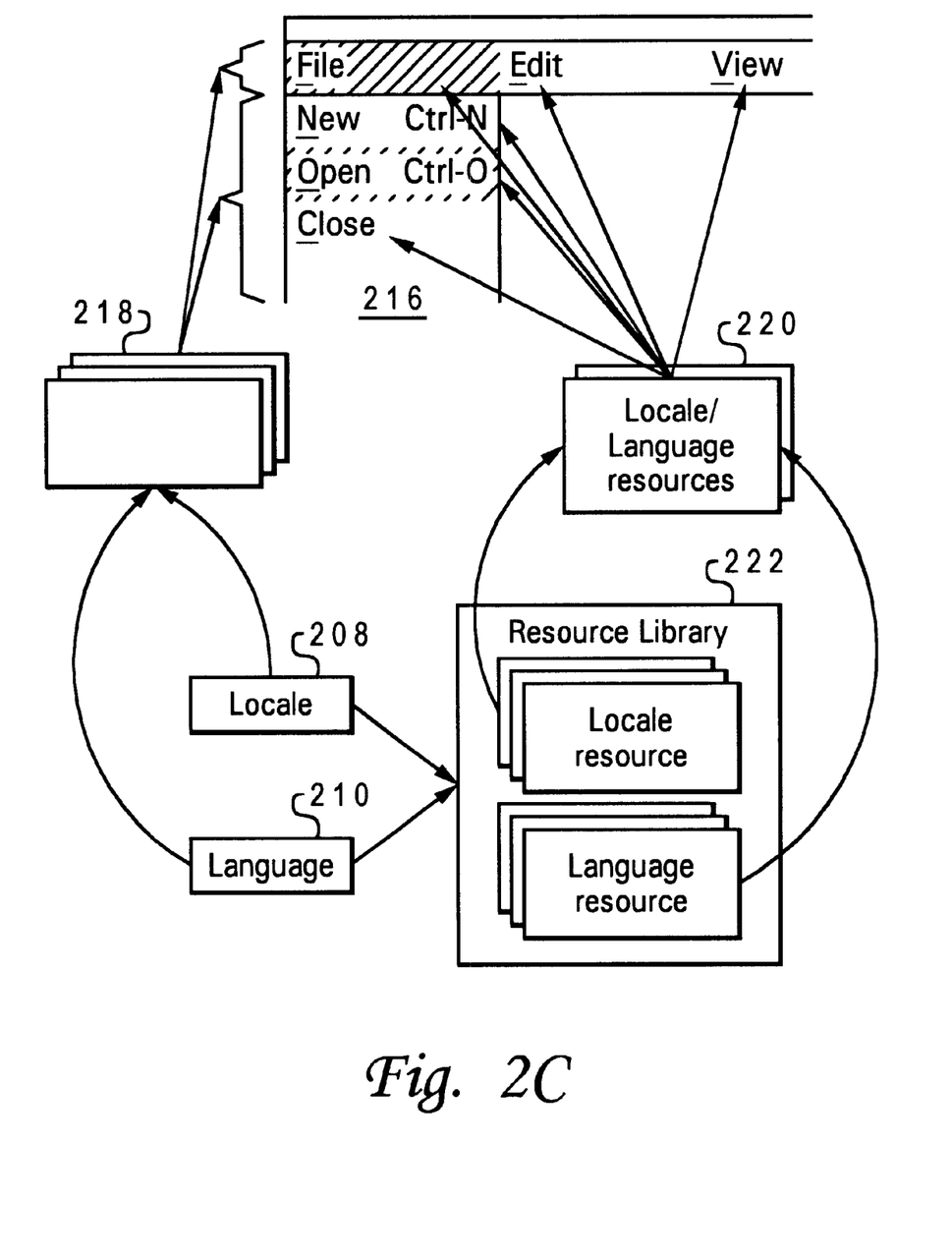
Figure 2D:
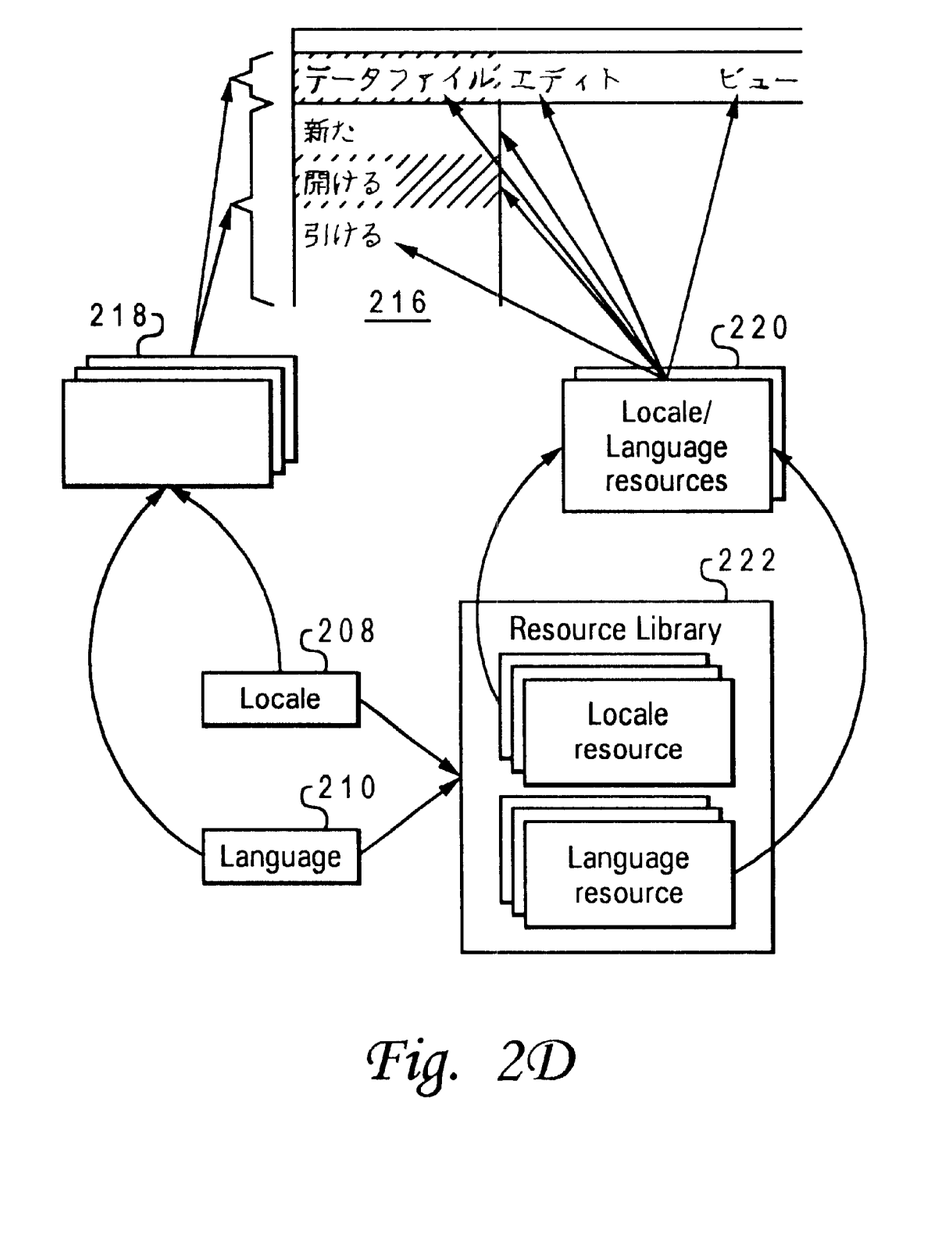

FIGS. 2B through 2D are diagrams of employing separate language and locale properties for user interface displays in accordance with a preferred embodiment of the present invention. In the example shown, a user interface 216 is implemented with user interface text (e.g., menu and button labels, dialog messages, and help text) separated from operational components 218 which generate the menus, buttons, dialogs, and other displays within user interface 216. The user interface text may then be formatted and loaded from locale and language resource files 220 selected from a library 222 of resource files based on the current setting of locale and language properties 208 and 210. Upon change of the locale and language properties 208 and 210, user interface 216 may be reloaded with the user interface text taken from different resource files selected from library 222 based on the new values for properties 208 and 210.

Figure 3:
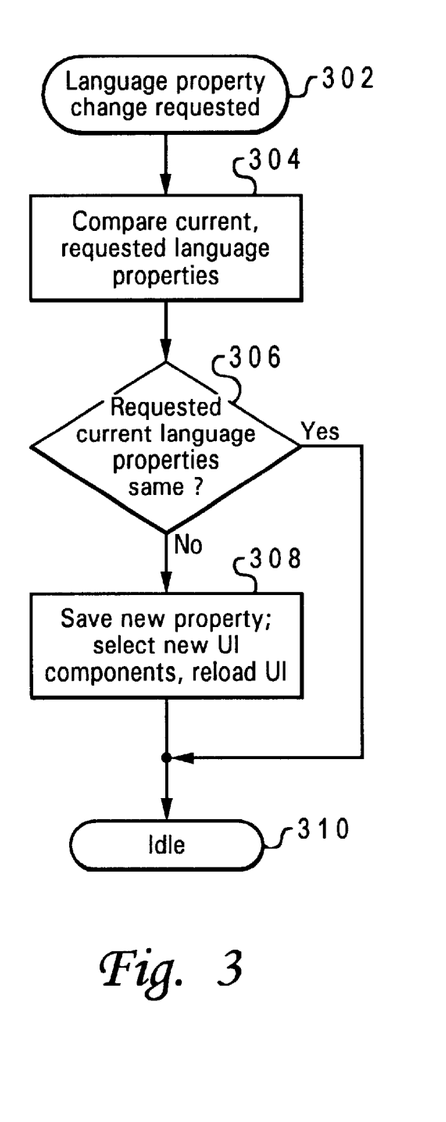
FIG. 3 depicts a high level flowchart for a process of changing a language property in accordance with a preferred embodiment of the present invention.

With reference now to FIG. 3, a high level flowchart for a process of changing a language property in accordance with a preferred embodiment of the present invention is depicted. The process begins at step 302, which illustrates is a language property change request being received. This may result from a user interface process provided to allow the language property to be selectively changed by the user.

The process next passes to step 304, which illustrates comparing the requested language property to the current language property, and then to step 306, which depicts a determination of whether the requested and current language properties are the same. If not, the process proceeds to step 308, which depicts setting the language property to the new setting, selecting new user interface components based on the new language property setting, and reloading the user interface with user interface text for the requested language. If so, however, or upon successfully reloading the user interface, the process proceeds to step 310, which illustrates the process becoming idle until another language property change request is received.

Figure 4:
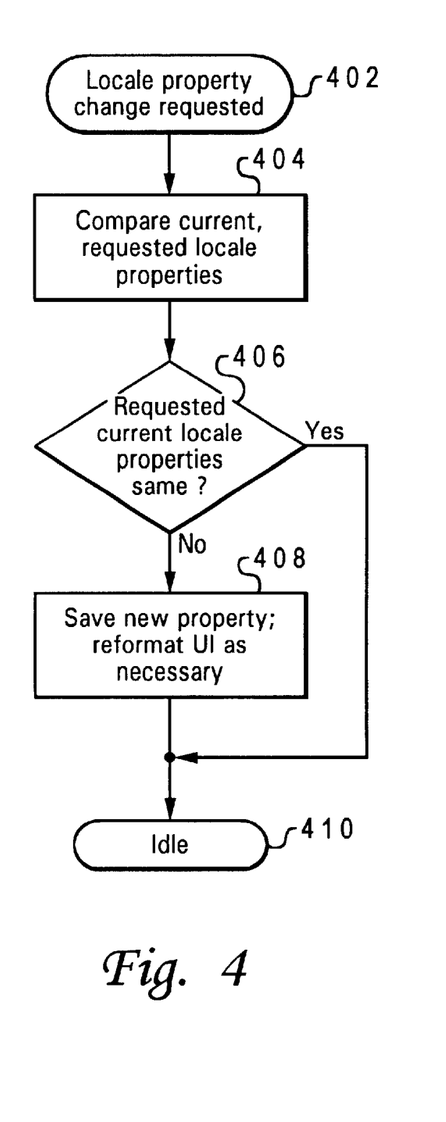
FIG. 4 is a high level flowchart for a process of changing a locale property in accordance with a preferred embodiment of the present invention.

Referring to FIG. 4, a high level flowchart for a process of changing a locale property in accordance with a preferred embodiment of the present invention is illustrated. The process begins at step 402, which depicts a locale property change request being received. This also may result from a user interface process provided to allow the locale property to be selectively changed by the user.

The process next passes to step 404, which illustrates comparing the requested locale property to the current locale property, and then to step 406, which depicts a determination of whether the requested and current locale properties are the same. If not, the process proceeds to step 408, which illustrates setting the locale property to the new setting and reformatting any user interface data as necessary. If so, however, or upon successfully reformatting the user interface, the process proceeds to step 410, which illustrates the process becoming idle until another language property change request is received.

The present invention allows a user interface to display text in a selected human language without requiring that a set of cultural conventions associated with a region in which the selected language is predominant also be observed. A user may thus view user interface text in Japanese while associated dates are formatted in the manner conventional to the United States, or may view English text without disturbing Russian currency, date, holidays and number conventions.

The present invention also facilitates dynamic switching of user interface views. Since display formatting is controlled separately from the actual text, user interface text may be more easily layered from the underlying operational components for generating user interface displays. Upon change of the language property, the user interface may be refreshed or reloaded with different text substituted in the user interface display.

It is important to note that while the present invention has been described in the context of a fully functional data processing system and/or network, those skilled in the art will appreciate that the mechanism of the present invention is capable of being distributed in the form of a computer usable medium of instructions in a variety of forms, and that the present invention applies equally regardless of the particular type of signal bearing media used to actually carry out the distribution. Examples of computer usable media include: nonvolatile, hard-coded type media such as read only memories (ROMs) or erasable, electrically programmable read only memories (EEPROMs), recordable type media such as floppy disks, hard disk drives and CD-ROMs, and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method of specifying language and locale in a data processing system, comprising:

defining a first property to control selection of a human language employed for user interface text within user control portions of a user interface; and defining a second property independent of the first property to control selection of cultural conventions employed for the user interface.

2. The method of claim 1, wherein the step of defining a first property to control selection of a human language employed for user interface text within user control portions of a user interface further comprises:

selecting a human language for user interface text within the user control portions of the user interface based on a setting of the first property.

3. The method of claim 1, wherein the step of defining a first property to control selection of a human language employed for user interface text further comprises:

storing an ISO-639 code as the first property.

4. The method of claim 1, wherein the step of defining a second property independent of the first property to control selection of cultural conventions employed for a user interface further comprises:

selecting a set of cultural conventions including date, time and number formatting, currency, and currency formatting for the user interface based on a setting of the second property.

5. The method of claim 1, wherein the step of defining a second property independent of the first property to control selection of cultural conventions employed for a user interface further comprises:

storing an ISO-3166 code as the second property.

6. The method of claim 1, further comprising:

permitting the first property to be altered independently of the second property.

7. The method of claim 1, further comprising:

defining the first and second properties in an operating system for the data processing system.

8. The method of claim 1, further comprising:

defining the first and second properties in an application environment running on top of an operating system for the data processing system.

9. A system for splitting language and locale in a data processing system, comprising:

means for defining a first property to control selection of a human language employed for user interface text within user control portions of a user interface; and means for defining a second property independent of the first property to control selection of cultural conventions employed for the user interface.

10. The system of claim 9, wherein the means for defining a first property to control selection of a human language employed for user interface text within user control portions of a user interface further comprises:

means for selecting a human language for user interface text within the user control portions of the user interface based on a setting of the first property.

11. The system of claim 9, wherein the means for defining a first property to control selection of a human language employed for user interface text further comprises:

means for storing an ISO-639 code as the first property.

12. The system of claim 9, wherein the means for defining a second property independent of the first property to control selection of cultural conventions employed for a user interface further comprises:

means for selecting a set of cultural conventions including date, time and number formatting, currency, and currency formatting for the user interface based on a setting of the second property.

13. The system of claim 9, wherein the means for defining a second property independent of the first property to control selection of cultural conventions employed for a user interface further comprises:

means for storing an ISO-3166 code as the second property.

14. The system of claim 9, further comprising:

means for permitting the first property to be altered independently of the second property.

15. The system of claim 9, further comprising:

means for defining the first and second properties in it an operating system for the data processing system.

16. The system of claim 9, further comprising:

means for defining the first and second properties in an application environment running on top of an operating system for the data processing system.

17. A computer program product within a computer usable medium for splitting language and locale in a data processing computer program product, comprising:

instructions for defining a first property to control selection of a human language employed for user interface text within user control portions of a user interface; and instructions for defining a second property independent of the first property to control selection of cultural conventions employed for the user interface.

18. The computer program product of claim 17, wherein the instructions for defining a first property to control selection of a human language employed for user interface text within user control portions of a user interface further comprises:

instructions for selecting a human language for user interface text within the user control portions of the user interface based on a setting of the first property.

19. The computer program product of claim 17, wherein the instructions for defining a first property to control selection of a human language employed for user interface text further comprises:

instructions for storing an ISO-639 code as the first property.

20. The computer program product of claim 17, wherein the instructions for defining a second property independent of the first property to control selection of cultural conventions employed for a user interface further comprises:

instructions for selecting a set of cultural conventions including date, time and number formatting, currency, and currency formatting for the user interface based on a setting of the second property.

21. The computer program product of claim 17, wherein the instructions for defining a second property independent of the first property to control selection of cultural conventions employed for a user interface further comprises:

instructions for storing an ISO-3166 code as the second property.

22. The computer program product of claim 17, further comprising:

instructions for permitting the first property to be altered independently of the second property.

23. The computer program product of claim 17, further comprising:

instructions for defining the first and second properties in an operating system for the data processing system.

24. The computer program product of claim 17, further comprising:

instructions for defining the first and second properties in an application environment running on top of an operating system for the data processing system.

25. A system for specifying language and locale in a data processing system, comprising:

a memory: and a data structure within the memory, the data structure including:

a first property to control selection of a human language employed for user interface text within user control portions of the user interface; and a second property independent of the first property to control selection of cultural conventions employed for a user interface.

* * * * *

UNITED STATES PATENT AND TRADEMARK OFFICE
CERTIFICATE OF CORRECTION

PATENT NO. : 6,339,755 B1
DATED : January 15, 2002
INVENTOR(S) : David James Hetherington et al.

It is certified that error appears in the above-identified patent and that said Letters Patent is hereby corrected as shown below:

<u>Column 7,</u>
Line 66, after the word "in" please remove "it".

Signed and Sealed this

Eighteenth Day of June, 2002

*Attest:*

JAMES E. ROGAN
*Attesting Officer*     *Director of the United States Patent and Trademark Office*